(12) United States Patent
Andersson et al.

(10) Patent No.: US 10,586,031 B2
(45) Date of Patent: Mar. 10, 2020

(54) BIOMETRIC AUTHENTICATION OF A USER

(71) Applicant: Fingerprint Cards AB, Göteborg (SE)

(72) Inventors: Markus Andersson, Staffanstorp (SE); Olis Olofsson, Malmö (SE)

(73) Assignee: Fingerprint Cards AB, Gothenburg (SE)

( * ) Notice: Subject to any disclaimer, the term of this patent is extended or adjusted under 35 U.S.C. 154(b) by 201 days.

(21) Appl. No.: 15/807,812

(22) Filed: Nov. 9, 2017

(65) Prior Publication Data
US 2018/0173863 A1 Jun. 21, 2018

(30) Foreign Application Priority Data

Dec. 21, 2016 (SE) ...................... 1651702

(51) Int. Cl.
*G06F 21/32* (2013.01)
*G06K 9/00* (2006.01)
*G06F 3/0346* (2013.01)

(52) U.S. Cl.
CPC ......... *G06F 21/32* (2013.01); *G06K 9/00067* (2013.01); *G06K 9/00087* (2013.01); *G06K 9/00892* (2013.01); *G06F 3/0346* (2013.01); *G06K 9/0002* (2013.01); *G06K 9/00288* (2013.01); *G06K 9/00335* (2013.01); *G06K 9/00617* (2013.01)

(58) Field of Classification Search
CPC ... G06F 21/32; G06F 3/0346; G06K 9/00892; G06K 9/00087; G06K 9/00067; G06K 9/00335; G06K 9/00288; G06K 9/0002; G06K 9/00617

USPC .......................................................... 726/19
See application file for complete search history.

(56) References Cited

U.S. PATENT DOCUMENTS

| | | | |
|---|---|---|---|
| 9,876,788 B1 * | 1/2018 | Ziraknejad | ............. G06F 21/45 |
| 10,248,771 B1 * | 4/2019 | Ziraknejad | ............. G06F 16/51 |
| 2006/0260988 A1 | 11/2006 | Schneider et al. | |
| 2014/0341440 A1 * | 11/2014 | Walch | ..................... G06F 21/40 382/116 |
| 2015/0220716 A1 | 8/2015 | Aronowitz et al. | |
| 2016/0048718 A1 | 2/2016 | Apostolos et al. | |
| 2017/0046508 A1 | 2/2017 | Shin et al. | |
| 2017/0083694 A1 | 3/2017 | Mardikar et al. | |

(Continued)

FOREIGN PATENT DOCUMENTS

WO 2014169287 A1 10/2014

OTHER PUBLICATIONS

Understanding Biometric Performance Evaluation, Nov. 2014, Precise Biometrics.https://precisebiometrics.com/wp-content/uploads/2014/11/White-Paper-Understanding-Biometric-Performance-Evaluation-QR.pdf (Year: 2014).*

(Continued)

*Primary Examiner* — Khalil Naghdali
(74) *Attorney, Agent, or Firm* — RMCK Law Group, PLC (57) ABSTRACT

The present invention relates to an electronic device. In particular, the present invention relates to an electronic device comprising a first and a second biometric sensor and processing circuitry arranged to authenticate the user of the electronic device. The present invention also relates to a corresponding method and computer program for authenticating the user of an electronic device.

19 Claims, 3 Drawing Sheets

(56) References Cited

U.S. PATENT DOCUMENTS

2019/0303551 A1* 10/2019 Tussy ..................... G06K 9/22

OTHER PUBLICATIONS

Anguiano Cervates, D. et al., "Comparison between fingerprint and behavioral biometric authentication using 2D and 3D gestures". 2016 IEEE Conference on Communications and Network Security (CNS). pp. 372-373, Oct. 2016.
Mayron, L., "Behavioral Biometrics for Universal Access and Authentication". Network and Parallel Computing; [Lecture Notes in Computer Science] Springer International Publishing, Cham. vol. 9175, Chap. 32, Nr. 558. pp. 330-339, Jul. 2015.
Swedish Search Report for Swedish Application No. 1651702-1 dated Jun. 30, 2017, 3 pages.

* cited by examiner

BIOMETRIC AUTHENTICATION OF A USER

CROSS REFERENCE TO RELATED APPLICATIONS

This application claims priority to Sweden Application No. 1651702-1, filed on Dec. 21, 2016, the disclosure of which is incorporated herein by reference in its entirety

TECHNICAL FIELD

The present invention relates to an electronic device. In particular, the present invention relates to an electronic device comprising a first and a second biometric sensor and processing circuitry arranged to authenticate the user of the electronic device. The present invention also relates to a corresponding method and computer program for authenticating the user of an electronic device.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance.

In a fingerprint sensor, a captured image is compared to one or more stored fingerprint templates in order to verify the identity of the user. In order to avoid performing matching on an image which is of low quality, where it is likely that no successful matching can be performed, a quality metric is assigned to the captured image before matching to determine if the specific image should proceed to the matching step.

However, some people may have difficulties in using the fingerprint sensor, due to having so-called "difficult fingers". For example, the characteristics of the fingerprint may be of generally low quality, i.e. fingerprint image contains low level fingerprint data. Alternatively, the fingerprint pattern may be difficult to detect due to a temporarily moisturized or dried-out finger.

When the fingerprint sensor is unable to properly match the captured image of the fingerprint with the one or more stored fingerprint templates, the user of the electronic device is often directed to provide a personal pin code for e.g. unlocking the electronic device. This has the effect that the fingerprint sensor cannot be sufficiently used. This may reduce the overall quality feel of the fingerprint sensor.

Accordingly, it is desirable to improve the usability of the fingerprint sensor.

SUMMARY OF THE INVENTION

In view of above-mentioned and other drawbacks, it is an object of the present invention to improve the authentication process of a user of an electronic device.

According to a first aspect of the invention, there is provided an electronic device, comprising a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data; a second biometric sensor arrangement for acquiring a second set of biometric data of the user of the electronic device, the second biometric sensor arrangement comprising a sensor being different from the sensor comprised with the first biometric sensor arrangement, and processing circuitry connected to the first and the second biometric sensor arrangement, wherein the processing circuitry is configured to acquire the first set of biometric data from the first biometric sensor arrangement; determine a first biometric matching level by comparing the first set of biometric data and an enrolled fingerprint of the finger of the user; compare the first biometric matching level with a first and a second threshold, wherein the second threshold corresponds to a higher matching level as compared to the first threshold; acquire, only if the first biometric matching level is above the first threshold but below the second threshold, the second set of biometric data from the second biometric sensor arrangement; determine a second biometric matching level by comparing the second set of biometric data and an enrolled user representation corresponding to the sensor comprised with the second biometric sensor arrangement; determine a third matching level based on the first and the second matching level, and authenticate the user of the electronic device if the third matching level is above a third threshold, wherein the third threshold corresponds to a higher matching level as compared to the second threshold.

An enrolled fingerprint should be understood to correspond to the fingerprint data of the user's finger which the user "previously" provided when activated/registered himself with the fingerprint sensor. Hence, the enrolled fingerprint corresponds to the fingerprint, or fingerprints, of the user of the electronic device. Within the context of the present disclosure, the expression "fingerprint data" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features. Similarly, the "enrolled user representation corresponding to the sensor comprised with the second biometric sensor arrangement" corresponds to previously acquired biometric data at which the user activated/registered the specific second biometric sensor arrangement. Furthermore, the second biometric sensor arrangement is different in comparison to the first biometric sensor arrangement. The second biometric sensor arrangement is thus not a fingerprint sensor arrangement. Various alternatives of second biometric sensor arrangements are described in further detail below.

The different thresholds, i.e. the first, second and third thresholds, may be different for different applications. For example, the first threshold is generally low and is arranged to determine if it is a finger that is positioned on the fingerprint sensor. Hence, if the first biometric matching level is above the first threshold, it is determined that a finger is positioned on the fingerprint sensor. Thereafter, if the first biometric matching level is in the range between the first and second thresholds, i.e. below, or at the second threshold, the detected fingerprint can not sufficiently authenticate the user of the electronic device. This may be caused by a difficult finger as mentioned above, or as a result of e.g. a temporarily slightly moisturized or wet finger, or a temporarily dry finger.

Moreover, the expression "processing circuitry" should be understood to include any type of computing device, such as an ASIC, a micro-processor, etc. It should also be understood that the actual implementation of such a processing circuitry may be divided between more than a single device/circuit.

The present invention is based on the insight that by using a second biometric sensor arrangement, in combination with the first biometric sensor arrangement, i.e. two different systems, a first and a second matching level can be determined for each of the two different systems. Based on the first and second matching levels, e.g. combining the first and second matching levels, a third matching level can be determined. Hence, the first and second matching levels are e.g. fused to form the third matching level, which third matching level is compared to a third threshold being higher in comparison to the second threshold. The third matching level may naturally depend on the technology applied by the second biometric sensor arrangement, e.g. the third matching level may be a ratio of the first and second matching levels. Hereby, if insufficient fingerprint data is acquired by the fingerprint sensor, further biometric data acquired by the second biometric sensor arrangement can, in combination with the fingerprint data be used to authenticate the user of the electronic device. An advantage is thus that the user of the electronic device will be able to use the fingerprint sensor to a larger extent, and get assistance from the second biometric sensor arrangement in those cases where the fingerprint data from the fingerprint sensor is insufficient to fully authenticate the user. Hereby, the user will not have to be instructed to provide the PIN code whenever e.g. the finger is temporarily moisturized or wet.

The sensor of the second biometric sensor arrangement may, for example, be a sensor for allowing an iris scan of the user to be performed, or a sensor for allowing a face recognition of the user to be performed. The sensor may, for example, be a camera or an IR scanning device. According to a further and preferred embodiment, the sensor of the second biometric sensor arrangement may be a motion sensor for providing sensed data based on movement of the electronic device in space. In such an embodiment, the enrolled user representation corresponding to the sensor comprised with the second biometric sensor arrangement may be an enrolled gesture performed by the user when moving the portable electronic device in space. Such a sensor may comprise at least one accelerometer.

Hereby, when the user positions the finger on the fingerprint sensor, and executes a motion of the electronic device, the third matching level is generated and can thus be compared to the third threshold for authentication of the user. In an exemplified implementation, when the user positions his finger on the fingerprint sensor and it is determined that the first matching level is in the range between the first and second thresholds, i.e. the acquired fingerprint data is not sufficiently good to authenticate the user, the user can, while preferably maintaining the finger on the fingerprint sensor, perform a gesture by moving the electronic device in space. If the detected gesture in combination with the detected fingerprint together provides a third matching level which is above the third threshold, the user can be authenticated as the authorized user of the electronic device. An advantage of using a motion sensor is that the biometric data for such a biometric sensor can be rather easily acquired, especially if the electronic device is portable. Hereby, the user only needs to e.g. "shake" the electronic device while preferably but optionally keeping the finger on the fingerprint sensor. The movement may also correspond to an angular position or angular movement of the electronic device, which angular position/movement is/are previously enrolled by the user. Hereby, the user will be provided with a feel as no additional action is required for authentication.

In a preferred embodiment, the level of the second threshold may be dependent on the technology applied by the second biometric sensor arrangement. As a gesture of the user may involve uncertainty in comparison to e.g. an iris scan, the second threshold should preferably be set higher when using a motion sensor in comparison to when using a sensor for allowing the iris scan. Accordingly, when setting a higher second threshold, the requirement of the detected fingerprint is higher in comparison to a lower second threshold when fusing the first and second matching levels for authenticating the user.

Moreover, the first, the second and the third threshold may be based on a so-called false acceptance rate (FAR). This is a rate determining how much "fault" is accepted. A lower FAR corresponds to a higher "correctness" of the biometric data in comparison to its enrolled data in comparison to a higher FAR. The FAR of the second threshold may thus be determined by the technology applied by the second biometric sensor arrangement. According to non-limiting examples, the first FAR threshold may be at least 1:100, the second FAR threshold may be at least 1:1000 and the third FAR threshold may be at least 1:50000.

According to an example embodiment, the second set of biometric data may be acquired from the second biometric sensor arrangement only if the user's finger is arranged at the fingerprint sensor for a complete duration of the acquisition of the second set of biometric data.

Also, according to an example embodiment, the electronic device may further comprise a third biometric sensor arrangement for acquiring a third set of biometric data of the user of the electronic device, the third biometric sensor arrangement comprising a sensor being different from the sensors comprised with the first and the second biometric sensor arrangement. The sensors of the second and the third biometric sensor arrangement may comprise a motion sensor and a camera. Hereby, a further sensor can assist in authenticating the user of the electronic device according to the principle of the invention described above.

The fingerprint sensor may in one embodiment be a fingerprint touch sensor, e.g. employing at least one of ultrasonic and capacitive sensing technology. These fingerprint sensors may be advantageous in that they can be made relatively small and energy efficient while being able to identify a fingerprint with high accuracy. However, the above described embodiments can equally as well be implemented and provide advantages using other types of fingerprint sensors as well (e.g. swipe) and employing different sensing technology such as including e.g. optical fingerprint sensors, etc.

Furthermore, according to an example embodiment, the electronic device may be portable. For example, the electronic device may be at least one of a mobile phone, a wearable device, a stylus, a tablet and a laptop.

According to a second aspect of the present invention, there is provided a method of authenticating a user of an electronic device, the electronic device comprising a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data; a second biometric sensor arrangement for acquiring a second set of biometric data of the user of the electronic device, the second biometric sensor arrangement comprising a sensor being different from the sensor comprised with the first biometric sensor arrangement, and processing circuitry connected to the first and the second biometric sensor arrangement, wherein the method comprises the steps of acquiring the first set of biometric data from the first biometric sensor arrangement; determining a first biometric matching level by comparing the first set of biometric data and an enrolled fingerprint of the finger of the user; comparing the first biometric matching level with a first and a second threshold, wherein the second threshold corresponds to a higher matching level as compared to the first threshold; acquiring, only if the first biometric matching level is above the first threshold but below the second threshold, the second set of biometric data from the second biometric sensor arrangement; determining a second biometric matching level by comparing the second set of biometric data and an enrolled user representation corresponding to the sensor comprised with the second biometric sensor arrangement; determining a third matching level based on the first and the second matching level, and authenticating the user of the electronic device if the third matching level is above a third threshold, wherein the third threshold corresponds to a higher matching level as compared to the second threshold.

According to a third aspect of the present invention, there is provided a computer program product comprising a non-transitory computer readable medium having stored thereon computer program means for processing circuitry adapted for controlling an electronic device, the electronic device comprising a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data; a second biometric sensor arrangement for acquiring a second set of biometric data of the user of the electronic device, the second biometric sensor arrangement comprising a sensor being different from the sensor comprised with the first biometric sensor arrangement, and the processing circuitry, the processing circuitry connected to the first and the second biometric sensor arrangement, wherein the computer program product comprises: code for acquiring the first set of biometric data from the first biometric sensor arrangement; code for determining a first biometric matching level by comparing the first set of biometric data and an enrolled fingerprint of the finger of the user; code for comparing the first biometric matching level with a first and a second threshold, wherein the second threshold corresponds to a higher matching level as compared to the first threshold; code for acquiring, only if the first biometric matching level is above the first threshold but below the second threshold, the second set of biometric data from the second biometric sensor arrangement; code for determining a second biometric matching level by comparing the second set of biometric data and an enrolled user representation corresponding to the sensor comprised with the second biometric sensor arrangement; code for determining a third matching level based on the first and the second matching level, and code for authenticating the user of the electronic device if the third matching level is above a third threshold, wherein the third threshold corresponds to a higher matching level as compared to the second threshold.

Effects and features of the second and third aspects are largely analogous to those described above in relation to any of the embodiment of the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
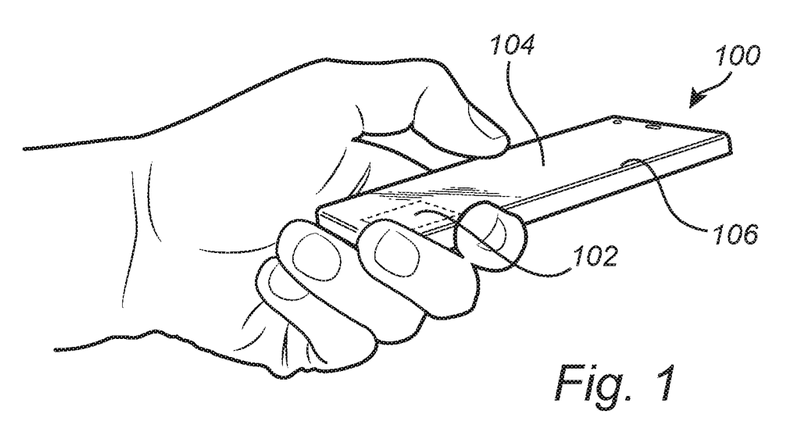
FIG. 1 schematically exemplifies an electronic device according to the present invention, in the form of a mobile phone comprising an integrated fingerprint sensor.

Turning now to the drawings and to FIG. 1 in particular, there is schematically illustrated the electronic device according to the present invention, in the form of a mobile phone 100 with a first biometric sensor arrangement comprising an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100. The electronic device also comprises a second biometric sensor arrangement which will be described in further detail below in relation to the description of FIG. 2.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
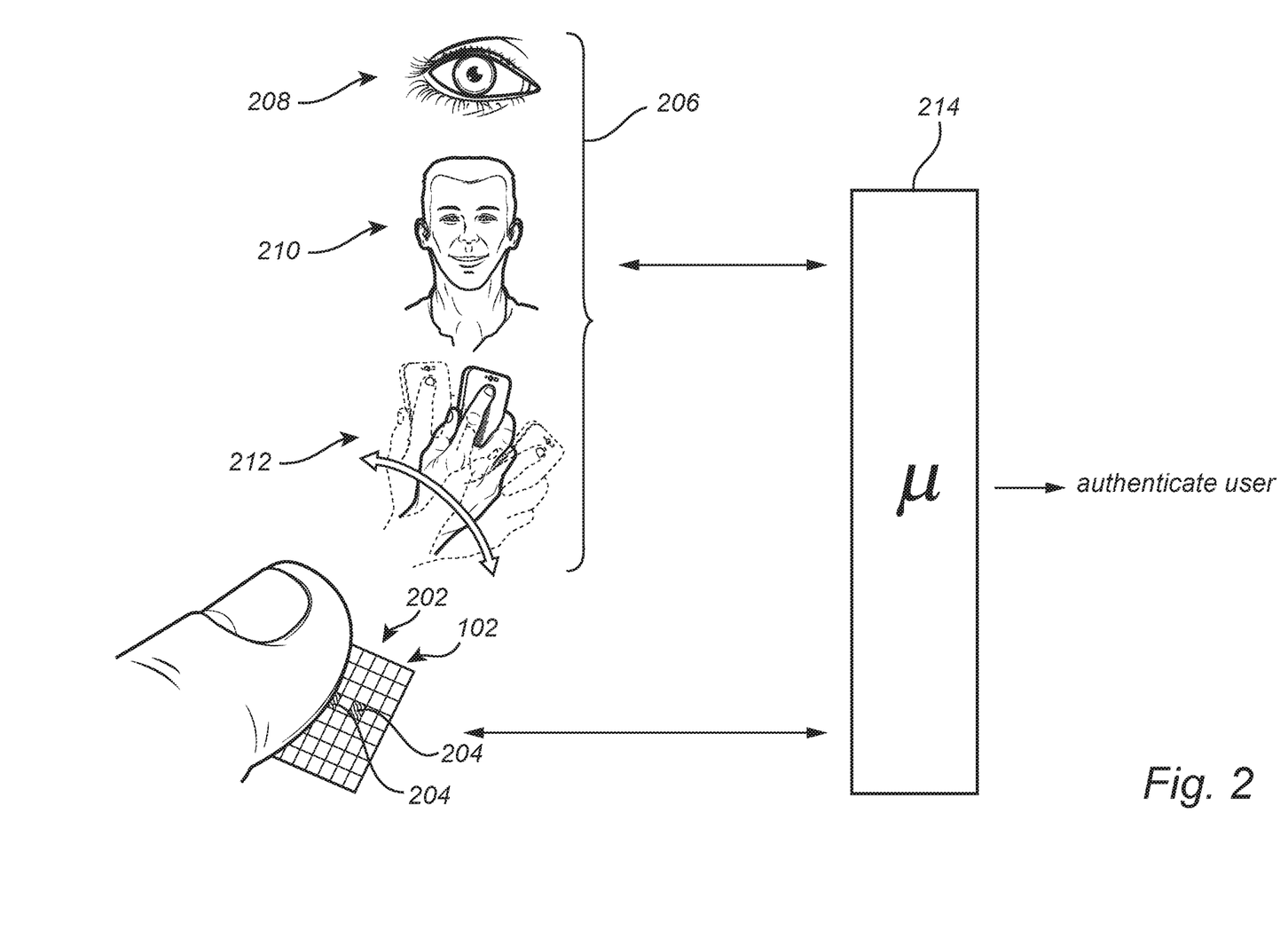
FIG. 2 is a schematic illustration of an example embodiment of a first and a second biometric sensor arrangement connected to processing circuitry.

With reference to FIG. 2 which schematically illustrates an example embodiment of the first 202 and second 206 biometric sensor arrangements, and their connection to processing circuitry 214 of the electronic device. In further detail, the electronic device comprising a first biometric sensor arrangement 202 comprising a fingerprint sensor 102, which in FIG. 2 is conceptually illustrated in a somewhat enlarged view. According to a non-limiting example, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 204. The fingerprint sensor 102 is thus arranged to capture an image of the fingerprint of a finger of a user of the electronic device 100. The fingerprint data is provided to the processing circuitry 214, as will be described further below.

Moreover, and as stated above, the electronic device 100 comprises a second biometric sensor arrangement 206. The second biometric sensor arrangement 206 is arranged to acquire biometric data being different in comparison to the biometric data of the fingerprint sensor, from the user of the electronic device 100. The second biometric sensor arrangement 206 thus comprises a sensor which is different in comparison to the fingerprint sensor 102. FIG. 2 illustrates three different exemplifying types of sensors that may be used by the second biometric sensor arrangement 206. It should however be understood that other types of sensors may equally as well be used instead of, or in combination with the exemplified sensors in FIG. 2.

According to an example embodiment, the sensor of the second biometric sensor arrangement 206 may be an iris scanning sensor 208 for allowing an iris scan of the user to be performed. The iris scanning sensor 208 may form part of a camera of the electronic device 100, such as an already existing camera provided with iris scanning functionality, or an additional iris scanning camera. The iris scanning sensor may also be an IR scanning device. Hereby, when the user has enrolled his eye(s), the iris scanning sensor 208 can be used as a complement to the fingerprint sensor 102 when authenticating a user of the electronic device.

According to another example embodiment, the sensor of the second biometric sensor arrangement 206 may be a face recognition sensor 210 for allowing a face recognition of the user to be performed. The face recognition sensor 210 may form part of a camera of the electronic device 100, such as an already existing camera provided with face recognition functionality, or an additional face recognition camera. Hereby, when the user has enrolled his face, the face recognition sensor 210 can be used as a complement to the fingerprint sensor 102 when authenticating a user of the electronic device.

According to a still further example embodiment, the sensor of the second biometric sensor arrangement 206 may be a motion sensor 212. The motion sensor 212 is arranged to provide sensed data based on movement of the electronic device 100. In FIG. 2, the sensed motion is illustrated by a pendulum movement of the electronic device 100. The motion sensor 212 preferably, comprises at least one accelerometer. The accelerometer may be an accelerometer already provided in the electronic device for also controlling other functionalities of the electronic device. The accelerometer may also be an accelerometer specifically designated for the sole purpose of assisting the motion sensor 212.

The authorized user of the electronic device 100 thus enrolls the motion sensor 212 by moving the electronic device at a specific motion in space. The specific motion in space is preferably a user specific motion in space. The user specific motion in space can be a motion corresponding to a movement when lifting the electronic device from e.g. a table or from the pocket, etc. The user specific motion can also be a predefined gesture, such as a movement of the electronic device in a clockwise circular motion, or a counter-clockwise circular motion, etc. Hence, any type of motions/gestures of the electronic device is conceivable. The motion sensor 212 can hereby be used as a complement to the fingerprint sensor 102 when authenticating a user of the electronic device, by providing substantially the same gesture to the electronic device as the enrolled gesture. The following will only describe a second biometric sensor arrangement 206 comprising the above described motion sensor 212.

Moreover, the electronic device 100 also comprises processing circuitry 214. The processing circuitry 214 is configured to acquire biometric data from the first biometric sensor arrangement 202 and the second biometric sensor arrangement 206.

The processing circuitry 214 further comprises a memory, such as a database, e.g. for storing one or a plurality of fingerprint template for one or a plurality of fingers for the user, and one or a plurality of templates of the second biometric sensor arrangement for the user. The processing circuitry 214 may include a microprocessor, microcontroller, programmable digital signal processor or another programmable device. The processing circuitry 214 may also, or instead, include an application specific integrated circuit, a programmable gate array or programmable array logic, a programmable logic device, or a digital signal processor. Where the processing circuitry 214 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 214 may be at least partly integrated with the first biometric sensor arrangement 202 and/or the second biometric sensor arrangement 206.

Accordingly, the processing circuitry 214 acquires a first set of biometric data from the first biometric sensor arrangement 202. Hereby, the user of the electronic device 100 seeks to gain access to the electronic device 100. The processing circuitry 214 determines a first biometric matching level by comparing the first set of biometric data with the enrolled fingerprint of the finger of the user. However, in the event the fingertip is e.g. slightly moisturized or too dry, e.g. it is a difficult finger, the received fingerprint data may not fully correspond to the enrolled fingerprint. The processing circuitry may thus not be able to sufficiently authorize the user solely by using the first set of biometric data, i.e. the first matching level is too low. However, the processing circuitry 214 may then in such a case acquire a second set of biometric data from the second biometric sensor arrangement 206. For example, the user may be advised to provide the user specific gesture to the electronic device 100. Hereby, the motion sensor 212 provides the sensed data based on the motion in space of the electronic device 100 to the processing circuitry 214. The processing circuitry 214 can thereafter compare the received data with enrolled data of the motion sensor 212 and determine a second biometric matching level.

The processing circuitry 214 can thereafter determine a third matching level which is based on the first and the second matching level. Hereby, e.g. an "almost approved" fingerprint, in combination with a gesture that is likely to represent the authorized user of the electronic device 100, can be used in combination to authenticate the user. In order to describe the functionality of the processing circuitry 214, and in particularly the method executed by the processing circuitry 214 for authenticating a user of an electronic device 100, reference is made to FIG. 3.

Figure 3:
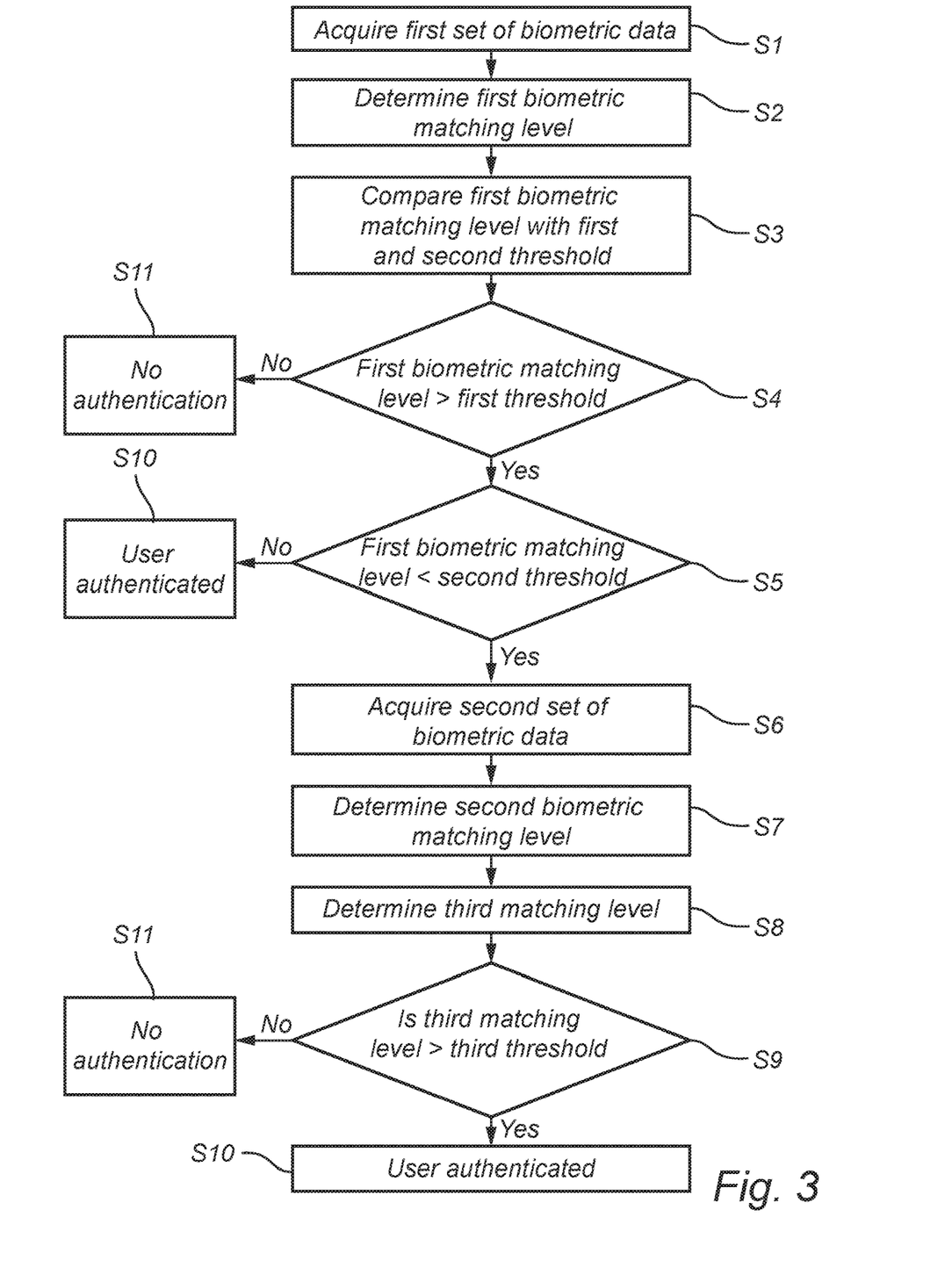
FIG. 3 is a flow chart illustrating an example embodiment of a method of authenticating a user according to an example embodiment.

Firstly, the processing circuitry 214 acquires S1 a first set of biometric data from the first biometric sensor arrangement 202. The user of the electronic device thus positions his finger on the fingerprint sensor 102 and fingerprint data is acquired by the processing circuitry 214. By comparing the first set of biometric data and an enrolled fingerprint of the finger of the authorized user, a first biometric matching level is determined S2. The first biometric matching level is thus a level of correspondence between the fingerprint data and the enrolled fingerprint. The first biometric matching level is thereafter compared S3 with a first and a second threshold. The first threshold is set lower than the second threshold and provided for determining if it is a finger that is positioned on the fingerprint sensor 102 or not. Accordingly, it is determined S4 if the first biometric matching level is higher than the first threshold. If the first biometric matching level is lower than the first threshold, it is determined that it is not a finger that is positioned on the fingerprint sensor 102, and no authentication S11 of the user can be made. On the other hand, if it is determined S5 that the first biometric matching level is higher than the first threshold and also higher than the second threshold, then user can be authenticated S10 solely by the received data from the fingerprint sensor 102.

However, if it is determined S5 that the first biometric matching level is somewhere between the first and second thresholds, i.e. the data acquired from the fingerprint sensor is determined to be a fingerprint but it is not sufficient for properly authenticating the user of the electronic device 100, the processing circuitry 214 acquires S6 a second set of data from the second biometric sensor arrangement 206. According to the above example with the motion sensor 212, the processing circuitry 214 acquires a detected gesture by the user of the electronic device 100. By comparing this gesture with an enrolled gesture made by the authorized user of the electronic device 100, a second biometric matching level is determined S7. Accordingly, the second biometric matching level is thus a level of correspondence between the gesture detected by the motion sensor 212 and the enrolled gesture.

By means of the determined first and second matching levels, a third matching level is determined S8. The first and second matching levels are fused to form the third matching level. Hereby, if the data from the fingerprint sensor is not sufficient to authenticate the user of the electronic device 100, a combination of the received fingerprint data and the data of the performed gesture may be used for authorizing the user. Hereby, the third matching level is compared S9 with a third threshold which is higher than the second threshold. If the third matching level is below the third threshold, then no authentication S11 can be made. However, if the third matching level is higher than the third threshold, the user is authenticated S10.

The third matching level is thus based on the first and second matching levels. According to an example embodiment, the third threshold may be based on the specific type of second biometric sensor arrangement used. Thus, using a second biometric sensor with a relatively high security level for identification, i.e. identification of a user can be made with a relatively high measure of security; the third threshold may be set lower in comparison to the use of a more low security biometric sensor arrangement. A biometric sensor arrangement comprising a sensor for iris scanning can be considered a high level security sensor in comparison to a biometric sensor comprising a motion sensor. Accordingly, a dynamic third threshold is provided.

According to another example, a first biometric matching level may be compensated depending on the type of second biometric sensor arrangement that is being used. For example, the difference between the first biometric matching level and the second threshold may be higher when using a second biometric sensor arrangement with high level of security in comparison to the use of a second biometric sensor arrangement with low level of security. In other words, a low match between the fingerprint and the enrolled finger can be compensated by the use of a second biometric sensor arrangement with a high level of security, while the use of a second biometric sensor arrangement with relatively low level of security demands that the matching level is almost at the second threshold. In other words, the second threshold may also be dependent on the specific type of second biometric sensor arrangement used, wherein the level of the second threshold is reversed proportional to the security level of the second biometric sensor arrangement used. Accordingly, a higher second threshold for lower identification security of the second biometric sensor arrangement, and a lower second threshold for increased higher identification security of the second biometric sensor arrangement.

Accordingly, using a difficult finger to gain access to the electronic device 100 can be compensated by providing a second set of biometric data to the processing circuitry 214 for authentication. Hereby, when using a difficult finger, the user can still gain access to the electronic device without the need of e.g. manually providing the pin code to the electronic device 100.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An electronic device, comprising:
    a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data;
    a second biometric sensor arrangement for acquiring a second set of biometric data of the user of the electronic device, the second biometric sensor arrangement comprising a sensor being different from the sensor comprised with the first biometric sensor arrangement, and
    processing circuitry connected to the first and the second biometric sensor arrangement, wherein the processing circuitry is configured to:
        acquire the first set of biometric data from the first biometric sensor arrangement;
        determine a first biometric matching level by comparing the first set of biometric data and an enrolled fingerprint of the finger of the user;
        compare the first biometric matching level with a first and a second threshold, wherein the second threshold corresponds to a higher matching level as compared to the first threshold;
        authenticate the user of the electronic device if the first biometric matching level is above the second threshold;
        acquire, only if the first biometric matching level is above the first threshold but below the second threshold, the second set of biometric data from the second biometric sensor arrangement;
        determine a second biometric matching level by comparing the second set of biometric data and an enrolled user representation corresponding to the sensor comprised with the second biometric sensor arrangement;
        determine a third matching level based on the first and the second matching level, and
        authenticate the user of the electronic device if the third matching level is above a third threshold, wherein the third threshold corresponds to a higher matching level as compared to the second threshold.

2. The electronic device according to claim 1, wherein the sensor of the second biometric sensor arrangement is a motion sensor for providing sensed data based on movement of the electronic device in space, and the enrolled user representation corresponding to the sensor comprised with the second biometric sensor arrangement is an enrolled gesture performed by the user when moving the portable electronic device in space.

3. The electronic device according to claim 2, wherein the motion sensor comprises at least one accelerometer.

4. The electronic device according to claim 1, wherein the sensor of the second biometric sensor arrangement is a sensor for allowing an iris scan of the user to be performed.

5. The electronic device according to claim 1, wherein the sensor of the second biometric sensor arrangement is a sensor for allowing a face recognition of the user to be performed.

6. The electronic device according to claim 4, wherein the sensor comprised with the second biometric sensor arrangement is a camera or an IR scanning device.

7. The electronic device according to claim 1, wherein the second set of biometric data is acquired from the second biometric sensor arrangement only if the user's finger is arranged at the fingerprint sensor for a complete duration of the acquisition of the second set of biometric data.

8. The electronic device according to claim 1, further comprising a third biometric sensor arrangement for acquiring a third set of biometric data of the user of the electronic device, the third biometric sensor arrangement comprising a sensor being different from the sensors comprised with the first and the second biometric sensor arrangement.

9. The electronic device according to claim 8, wherein the sensors of the second and the third biometric sensor arrangement comprises a motion sensor and a camera.

10. The electronic device according to claim 1, wherein the fingerprint sensor is a fingerprint touch sensor.

11. The electronic device according to claim 1, wherein the first, the second and the third threshold is based on a false acceptance rate (FAR).

12. The electronic device according to claim 11, wherein the first FAR threshold is at least 1:100.

13. The electronic device according to claim 11, wherein the second FAR threshold is at least 1:1000.

14. The electronic device according to claim 11, wherein the third FAR threshold is at least 1:50000.

15. The electronic device according to claim 1, wherein the electronic device is portable.

16. The electronic device according to claim 1, wherein the electronic device is at least one of a mobile phone, a wearable device, a stylus, a tablet and a laptop.

17. The electronic device according to claim 1, wherein the fingerprint sensor employs at least one of ultrasonic and capacitive sensing technology.

18. A method of authenticating a user of an electronic device, the electronic device comprising:
    a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data;
    a second biometric sensor arrangement for acquiring a second set of biometric data of the user of the electronic device, the second biometric sensor arrangement comprising a sensor being different from the sensor comprised with the first biometric sensor arrangement, and processing circuitry connected to the first and the second biometric sensor arrangement, wherein the method comprises:
acquiring the first set of biometric data from the first biometric sensor arrangement;
determining a first biometric matching level by comparing the first set of biometric data and an enrolled fingerprint of the finger of the user;
comparing the first biometric matching level with a first and a second threshold, wherein the second threshold corresponds to a higher matching level as compared to the first threshold;
authenticating the user of the electronic device if the first biometric matching level is above the second threshold;
acquiring, only if the first biometric matching level is above the first threshold but below the second threshold, the second set of biometric data from the second biometric sensor arrangement;
determining a second biometric matching level by comparing the second set of biometric data and an enrolled user representation corresponding to the sensor comprised with the second biometric sensor arrangement;
determining a third matching level based on the first and the second matching level, and
authenticating the user of the electronic device if the third matching level is above a third threshold, wherein the third threshold corresponds to a higher matching level as compared to the second threshold.

19. Computer program product comprising a non-transitory computer readable medium having stored thereon computer program means for processing circuitry adapted for controlling an electronic device, the electronic device comprising:
a first biometric sensor arrangement for acquiring a first set of biometric data of a user of the electronic device, the first biometric sensor arrangement comprising a fingerprint sensor having an array of pixels and configured for capturing fingerprint data of a fingerprint pattern of a finger of the user of the electronic device, wherein the fingerprint data represents the first set of biometric data;
a second biometric sensor arrangement for acquiring a second set of biometric data of the user of the electronic device, the second biometric sensor arrangement comprising a sensor being different from the sensor comprised with the first biometric sensor arrangement, and
the processing circuitry, the processing circuitry connected to the first and the second biometric sensor arrangement, wherein the computer program product comprises:
code for acquiring the first set of biometric data from the first biometric sensor arrangement;
code for determining a first biometric matching level by comparing the first set of biometric data and an enrolled fingerprint of the finger of the user;
code for comparing the first biometric matching level with a first and a second threshold, wherein the second threshold corresponds to a higher matching level as compared to the first threshold;
code for authenticating the user of the electronic device if the first biometric matching level is above the second threshold;
code for acquiring, only if the first biometric matching level is above the first threshold but below the second threshold, the second set of biometric data from the second biometric sensor arrangement;
code for determining a second biometric matching level by comparing the second set of biometric data and an enrolled user representation corresponding to the sensor comprised with the second biometric sensor arrangement;
code for determining a third matching level based on the first and the second matching level, and
code for authenticating the user of the electronic device if the third matching level is above a third threshold, wherein the third threshold corresponds to a higher matching level as compared to the second threshold.

* * * * *